Figure 2:
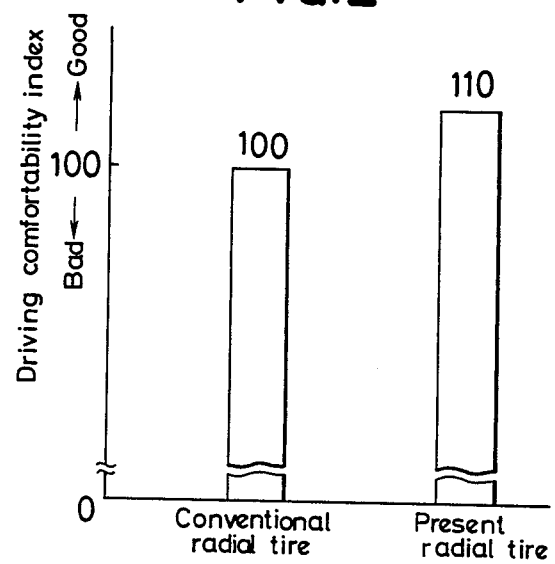

United States Patent [19]

Kabe et al.

[11] Patent Number: 4,711,286
[45] Date of Patent: Dec. 8, 1987

[54] PNEUMATIC RADIAL TIRE FOR PASSENGER CAR

[75] Inventors: Kazuyuki Kabe, Hiratsuka; Tuneo Morikawa, Hadano; Shuji Takahashi, Hiratsuka, all of Japan

[73] Assignee: The Yokohama Rubber Co., Ltd., Tokyo, Japan

[21] Appl. No.: 843,432

[22] Filed: Mar. 24, 1986

[51] Int. Cl.$^4$ .............................. D02G 3/48; B60C 9/26
[52] U.S. Cl. ...................................... 152/527; 57/902; 152/529; 152/560; 156/123
[58] Field of Search .................. 152/526–529, 152/536, 560; 57/902, 249; 156/123, 130

[56] References Cited

U.S. PATENT DOCUMENTS 3,831,657  8/1974  Dillenschneider ............... 152/528
4,240,488  12/1980  Wilcox ........................ 152/528 X Primary Examiner—Donald E. Czaja
Assistant Examiner—Thomas Bokan
Attorney, Agent, or Firm—Armstrong, Nikaido, Marmelstein & Kubovcik

[57] ABSTRACT

Disclosed herein is a pneumatic radial tire for a passenger car wherein, among a plurality of belt layers, a belt layer or layers consisting of aromatic polyamide fiber cords are disposed on the side of a carcass layer, a belt layer or layers consisting of carbon fiber cords are disposed on the side of a tread portion in the proximity of the belt layer on the carcass layer side, the end portions of at least one of the belt layers on the carcass layer side, consisting of the aromatic polyamide fiber cords, are bent towards the tread portion so that the bent portions cover the end portions of the belt layer on the tread portion side, consisting of the carbon fiber cords.

7 Claims, 6 Drawing Figures

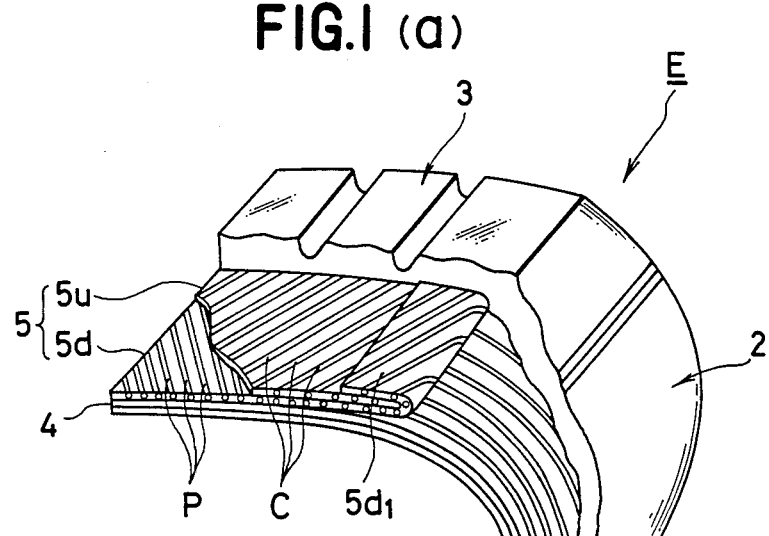
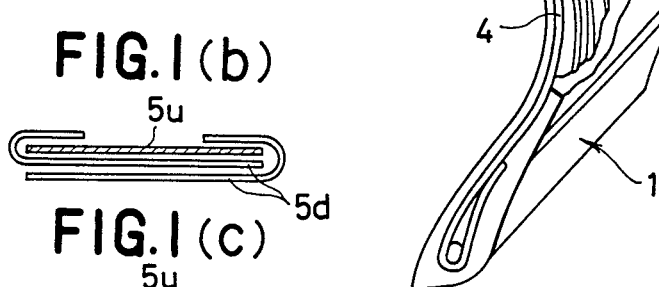
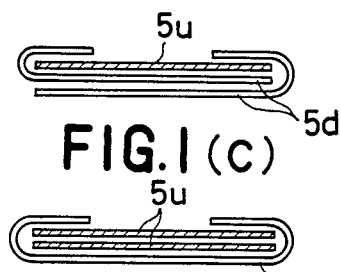
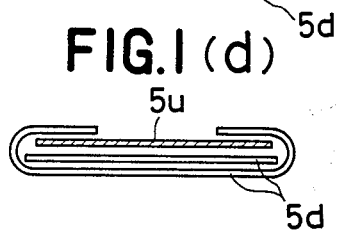

PNEUMATIC RADIAL TIRE FOR PASSENGER CAR

BACKGROUND

This invention relates generally to a pneumatic radial tire for a passenger car, and more specifically to a pneumatic radial tire for a passenger car having an improved belt layer structure in order to improve high speed performance and driving confortableness of the tire and to reduce the tire weight.

Requirements for tires have become severer and severer in recent years with the development in highways, and steel radial tires have replaced conventional bias tires as the tires that satisfy these requirements.

In steel radial tires, a carcass layer having its reinforcing cords arranged substantially at 90° to a tire circumferential direction is disposed between a pair of right and left bead portions and is covered with a plurality of belt layers reinforced by steel cords. Therefore, the steel radial tires exhibit various excellent properties as the tire in high speed performance, driving stability, wear resistance, low rolling resistance, and so forth.

However, the steel radial tire is not yet free from the problem that driving comfortableness is not high because a plurality of belt layers reinforced by the steel cords are hard and stiff.

In conjunction with the tire weight, the weight of the steel radial tire has been reduced recently to such a level which is substantially equal to that of bias tires of an equivalent size, but further reduction of the tire weight seems to have reached the limit.

Since a plurality of belt layers reinforced by the steel cords have great mass, the belt layers are likely to swell up due to the centrifugal force of the tire at the time of high speed rotation, whereby so-called "separation" is likely to occur at both end portions of the belt layers. Thus, the steel radial tire has reached the limit in the aspect of high speed performance, too.

SUMMARY

Therefore, it is an object of the present invention to provide an excellent pneumatic radial tire for a passenger car employing an improved belt layer structure in order to improve high speed performance and driving comfortableness and to reduce the tire weight.

In a pneumatic radial tire for a passenger car of the type which consists of a pair of right and left bead portions, a pair of right and left side wall portions continuing the bead portions, respectively, and a tread portion interposed between the side wall portions, and in which a carcass layer having a cord angle in the range of 70° to 90° to a tire circumferential direction is mounted between the bead portions and a plurality of belt layers crossing one another at a cord angle in the range of 10° to 35° to the tire circumferential direction are disposed on the carcass layer at the tread portion, the object of the present invention described above can be accomplished by a pneumatic radial tire for a passenger car which is characterized in that:

(1) among the belt layers described above, a belt layer or layers consisting of aromatic polyamide fiber cords are disposed on the side of the carcass layer, and a belt layer or layers consisting of carbon fiber cords are disposed on the side of the tread portion in the proximity of the belt layer(s) on the carcass layer side; and (2) the end portions of at least one belt layer consisting of the aromatic polyamide fiber cords on the side of the carcass layer are bent so that the bent portions cover the end portions of the belt layer(s) consisting of the carbon fiber cords on the side of the tread portion.

The above and other objects and novel features of the present invention will become more apparent from the following description when taken in conjunction with the accompanying drawings.

THE DRAWINGS

FIGS. 1(a) through 1(d) show some preferred embodiments of the present invention, wherein:

FIG. 1(a) is a partial cut-away perspective view of a first embodiment; and

Figure 3:
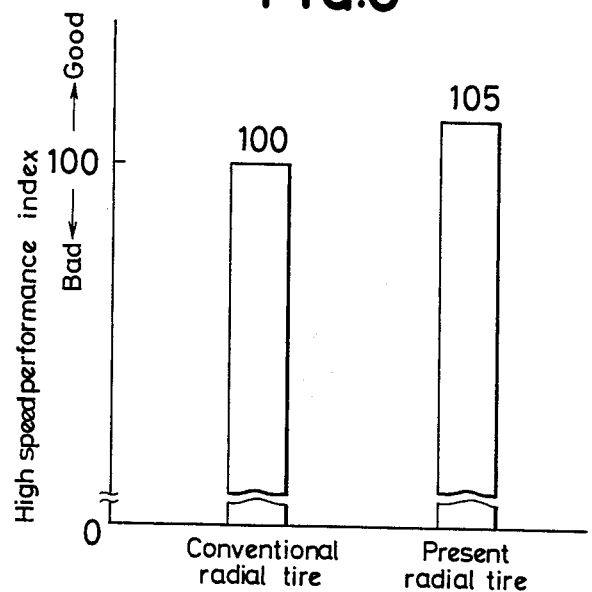

FIGS. 1(b) through 1(d) are schematic views, each showing the principal portions, of second to fourth embodiments;

FIG. 2 is a diagram showing the result of the test for comfortableness to drive; and FIG. 3 is a diagram showing the result of the test for high speed performance.

THE PREFERRED EMBODIMENTS

In FIG. 1(a), symbol E represents a pneumatic radial tire for a passenger car in accordance with the first embodiment of the present invention. This radial tire consists of a pair of right and left bead portions 1, 1, a pair of right and left side wall portions 2, 2 continuing the bead portions 1, 1 and a tread portion 3 interposed between the side wall portions 2, 2. A carcass layer 4 whose cord angle is from 70° to 90° to a tire circumferential direction is fitted between the right and left bead portions 1, 1, and a multi-layered belt layer 5 which cross one another at a cord angle of 10° to 35° to the tire circumferential direction is disposed on the carcass layer 4 at the tread portion 3. (1) In the present invention, the belt layer 5 described above comprises a belt layer 5d consisting of aromatic polyamide fiber cords P disposed on the carcass layer side 4 and a belt layer 5u consisting of carbon fiber cords C disposed on the tread portion side 3 close to the belt layer 5d.

Since the aromatic polyamide fiber cords P are used as the reinforcing cords for the belt layer 5d on the carcass layer side as described above, this embodiment provides the following effects.

(a) In comparison with the belt layer of the conventional steel radial tire which is reinforced by steel cords, the outward bending rigidity of the surface of the belt layer can be reduced. Therefore, impact force at the time of getting over a projection can be mitigated and comfortableness to drive can be drastically improved.

(b) When the total strength remains the same, this embodiment can reduce the weight in comparison with the belt layer using the steel cords as the reinforcing cords. Therefore, high speed performance can be improved.

The aromatic polyamide fiber cords P to be used as the reinforcing cords of the belt layer 5d on the carcass layer side are preferably produced by twisting aromatic polyamide fibers having properties of tensile strength of at least 150 kg/mm$^2$ and tensile elastic modulus of at least 3,000 kg/mm$^3$ in such a fashion that a twist coefficient K expressed by the following formula is in the range of $1,000 \leq K \leq 2,500$ to form the cords and then subjecting the cords to bonding heat-treatment:

$$K = T\sqrt{D}$$

where
K ... twist coefficient,
T ... number of twists of cord (turns/10 cm),
D ... total denier of cord.

In the present invention, since the carbon fiber cords C are used as the reinforcing cords of the belt layer $5u$ on the tread portion side as described above, comfortableness to drive can be improved drastically in comparison with the conventional steel radial tire for the same reason as in the case of the belt layer $5d$ on the carcass layer side which uses the aromatic polyamide fiber cords P as the reinforcing cords, and high speed performance can likewise be improved.

Preferably, the carbon fiber cords C to be used as the reinforcing cords of the belt layer $5u$ on the tread portion side are prepared by putting 10 to 50%, based on the unit length of the carbon fiber, of an adhesive to the carbon fiber having tensile strength of at least 100 kg/mm$^2$ and preferably at least 200 kg/mm$^2$ and tensile elastic modulus of at least 5,000 kg/mm$^2$ and preferably at least 15,000 kg/mm$^2$, and then twisting the carbon fiber cords in such a fashion that the twist coefficient K expressed by the following formula is within the range of $0 \leq K \leq 1,800$:

$$K = T\sqrt{D}$$

where
K ... twist coefficient,
T ... number of twists of cord (turns/10 cm),
D ... total denier of cord.

The twist structure in this case may be a folded twist structure wherein several carbon fibers are first subjected to primary twisting and then several twisted fibers are subjected to final twisting, or a single twist structure wherein one filamentary carbon fiber is merely twisted.

Incidentally, it is not preferred to dispose the belt layers consisting of the aromatic polyamide fiber cords P on both carcass layer side 4 and the tread portion side 3 because rigidity in the tire circumferential direction becomes insufficient and driving stability will be lower than that of the conventional steel radial tire. (2) In accordance with the present invention, further, the end portions of at least one layer of the belt layers $5d$ on the carcass layer side consisting of the aromatic polyamide fiber cords P are bent towards the tread portion side 3, and these belt portions $5d_1$ cover the end portions of the belt layer $5u$ on the tread portion side consisting of the carbon fiber cords C.

In other words, the end portions of the belt layer $5u$ on the tread portion side consisting of the carbon fiber cords C are covered with the bent portions $5d_1$ of the belt layer $5d$ on the carcass layer side consisting of the aromatic polyamide fiber cords P that have higher bending fatigue resistance than the belt layer $5u$.

Therefore, protection of the end portions of the belt layer $5u$ on the tread portion side consisting of the carbon fiber cords C can be drastically improved. Therefore, it is possible to prevent the swell of the end portions of the belt layer due to the centrifugal force of the tire during high speed driving, to check the occurrence of separation and to improve the durability of tire.

In the first embodiment of the present invention shown in FIG. 1(a), one belt layer $5d$ consisting of the aromatic polyamide fiber cords P is disposed on the side of the carcass layer 4, while one layer of the belt layer $5u$ consisting of the carbon fiber cords C is disposed on the side of the tread portion 3 in the proximity of the belt layer $5d$ on the carcass layer side. Furthermore, both right and left end portions of the belt layer $5d$ on the carcass layer side consisting of the aromatic polyamide fiber cords P are bent towards the tread portion 3, and these bent portions $5d_1$ cover the right and left end portions of the belt layer $5u$ on the tread portion side consisting of the carbon fiber cords.

In the second embodiment of the present invention shown in FIG. 1(b), two belt layers $5d$ consisting of the aromatic polyamide fiber cords P are disposed on the carcass layer side 4 while one belt layer $5u$ consisting of the carbon fiber cords C is disposed on the tread portion side 3 in the proximity of the belt layers $5d$ on the carcass layer side. Furthermore, one of the end portions of each belt layer $5d$ on the carcass layer side consisting of the aromatic polyamide fiber cords P is bent towards the tread portion 3 in such a manner as to face the bent end portion of the other belt layer $5d$ and to cover the right and left end portions of the belt layer $5u$ on the tread portion side consisting of the carbon fiber cords C.

In the third embodiment of the present invention shown in FIG. 1(c), one belt layer $5d$ consisting of the aromatic polyamide fiber cords P is disposed on the carcass layer side 4 while two belt layers $5u$ consisting of the carbon fiber cords C are disposed on the tread portion side 3 in the proximity of the belt layer $5d$. Furthermore, both right and left end portions of the belt layer $5d$ consisting of the aromatic polyamide fiber cords P are bent towards the tread portion 3 so that these bent portions $5d_1$ cover both right and left portions of the belt layers $5u$ consisting of the carbon fiber cords C.

In the fourth embodiment of the present invention shown in FIG. 1(d), two belt layers $5d$ consisting of the aromatic polyamide fiber cords P are disposed on the carcass layer side 4 while one belt fiber $5u$ consisting of the carbon fiber cords C is disposed on the tread portion side 3 in the proximity of the belt layers $5d$, and both right and left end portions of the lower layer of the belt layers $5d$ are bent towards the tread portion 3 in such a manner that the end portions $5d_1$ cover the right and left end portions of the belt layer $5u$ on the tread portion side consisting of the carbon fiber cords C.

Next, the effect of the present invention will be described more definitely with reference to Experimental Example.

Experimental Example

Driving comfortability (vibration comfortableness performance) test and high speed performance test were carried out using the tire of the present invention and the conventional radial tire, each having the following specification.

[The Present Radial Tire]
tire size ... 205/60 R 15
carcass layer ... one layer using polyester cords of 1,000d/2 as the reinforcing cords were disposed in such a manner that the cord angles was 90° to the tire circumferential direction.
belt layer on carcass layer side ... one layer using aromatic polyamide fiber cords of 1,500d/2, $35^Z \times 35^S$ turns/10 cm, K=1917 as the reinforcing cords was disposed in such a manner that the cord angle was 24° to the tire circumferential direction, and both right and left end portions of this layer were bent towards the tread portion side so that the bent portions covered the right and left end portions of the belt layer on the tread side consisting of the carbon fiber cords.

belt layer on the tread portion side . . . one layer using carbon fiber cords having 1800d/2 and a twist coefficient K=600 (folded twist structure, 10 turns/10 cm) was disposed so that the cord angle was 21° to the tire circumferential direction.

[Conventional Radial Tire]

tire size 205/60 R 15 carcass layer . . . one layer using polyester cords of 1000d/2 as the reinforcing cords was disposed so that the cord angle was 90° to the tire circumferential direction.

belt layer on the carcass layer side . . . one layer using steel cords of 3×7 (0.15) as the reinforcing cords was disposed so that the cord angle was 24° to the tire circumferential direction, and both right and left end portions were bent towards the tread portion side so that these bent portions covered the right and left end portions of the belt layer on the tread portion side.

belt layer on the tread portion side . . . one layer using steel cords of 1×5 (0.25) as the reinforcing cords was disposed so that the cord angle was 21° to the tire circumferential direction.

(a) Driving comfortability test

Driving comfortability test was carried out indoors using each of the sample tires described above and a projection tester.

The projection tester is equipped with a semispherical projection of a 20 mm diameter at one position on the periphery of a drum which is 2,500 mm in diameter, and detects the axial force when the sample tire gets over the projection. The magnitude of this axial force is used as a representative value of the driving comfortability. In this case, the driving comfortability test was carried out at an air pressure of 2.0 kg/cm$^2$, a load of 515 kg and speeds of 60 km/hr, 80 km/hr, 100 km/hr and 120 km/hr, respectively.

The test results were shown in FIG. 2. The diagram represents the driving comfortability in terms of index using the test result of the conventional radial tire as 100.

As can be seen clearly from the test result shown in Table 2, the driving comfortability was improved by about 10% by the tire of the present invention when compared with the conventional radial tire.

(b) High speed performance test

High speed performance test was carried out indoors using each of the sample tires described above and a drum tester (1,707 mm in diameter).

In this case, the air pressure was 3.0 kg/cm$^2$ and the load was 515 kg but the speed was increased step-wise by 10 km/hr every 10 minutes until the tire was broken.

The test result was shown in FIG. 3. The diagram represents the high speed performance in terms of index using the test result of the conventional radial tire as 100.

As can be seen clearly from the test result shown in FIG. 3, the high speed performance could be improved by about 5% by the tire of the present invention when compared with the conventional radial tire.

As described above, the present invention disposes the belt layer consisting of the aromatic polyamide fiber cords on the carcass layer side and the belt layer consisting of the carbon fiber cords on the tread portion side in the proximity of the belt layer on the carcass layer side. Furthermore, the end portions of at least one layer of the belt layers on the carcass layer side consisting of the aromatic polyamide fiber cords are bent towards the tread portions so that the bent portions cover the end portions of the belt layer on the tread portion side consisting of the carbon fiber cords. Therefore, the present invention can improve both high speed performance and driving comfortability, and can also reduce the tire weight.

We claim:

1. In a pneumatic radial tire with improved high speed performance and driving comfortableness for a passenger car of the type which consists of a pair of right and left bead portions, a pair of right and left side wall portions continuing said bead portions, respectively and a tread portion interposed between said side wall portions, and in which a carcass layer having a cord angle in the range of 70° to 90° to a tire circumferential direction is mounted between said bead portions and a plurality of belt layers crossing one another and at cord angles in the range of 10° to 35° to the tire circumferential direction are disposed on said carcass layer at said tread portion, the improvement wherein:

(1) among said belt layers, a belt layer consisting of aromatic polyamide fiber cords is disposed on the side of said carcass layer, and a belt layer consisting of carbon fiber cords is disposed on the side of said tread portion in the proximity of said belt layer on the carcass layer side; and (2) the end portions of at least one belt layer consisting of the aromatic polyamide fiber cords on the side of said carcass layer are bent so that the bent portions cover the end portions of said belt layer consisting of the carbon fiber cords on the side of said tread portion.

2. A pneumatic radial tire for a passenger car according to claim 1, wherein said aromatic polyamide fiber cord is produced by twisting aromatic polyamide fibers having a tensile strength of at least 150 kg/mm$^2$ and a tensile elastic modulus of at least 3,000 kg/mm$^2$ to form said cord in such a fashion that a twist coefficient K expressed by the following formula is within the range of $1,000 \leq K \leq 2,500$, and then subjecting said twisted aromatic polyamide fiber cords to bonding heat-treatment:

$$K = T\sqrt{D}$$

where

K . . . twist coefficient,

T . . . number of twist of cords (turns/10 cm),

D . . . total denier of cords.

3. A pneumatic radial tire for a passenger car according to claim 1, wherein said carbon fiber cord is produced by applying 10 to 50% of an adhesive to said carbon fiber, based on the weight of unit length of carbon fibers, said carbon fibers having a tensile strength of at least 100 kg/mm$^2$ and a tensile elastic modulus of at least 5,000 kg/mm$^2$, and twisting said carbon fibers to form said cord in such a fashion that a twist coefficient K expressed by the following formula is within the range of $0 \leq K \leq 1,800$:

$$K = T\sqrt{D}$$

where
- K . . . twist coefficient,
- T . . . number of twist of cord (turns/10 cm),
- D . . . total denier of cord.

4. A pneumatic radial tire for a passenger car according to claim 1, wherein one belt layer consisting of the aromatic polyamide fiber cords is disposed on the side of said carcass layer, one belt layer consisting of the carbon fiber cords is disposed on the side of said tread portion in the proximity of said belt layer on the side of said carcass layer, both right and left end portions of said belt layer consisting of the aromatic polyamide fiber cords on the side of said carcass layer are bent so that the bent portions cover both right and left end portions of said belt layer consisting of the carbon fiber cords on the side of said tread portion.

5. A pneumatic radial tire for a passenger car according to claim 1, wherein two belt layers consisting of the aromatic polyamide fiber cords are disposed on the side of said carcass layer, one belt layer consisting of the carbon fiber cords is disposed on the side of said tread portion in the proximity of said belt layers on the side of said carcass layer, one of the end portions of each of said belt layers on the side of said carcass layer is bent towards said tread portion in such a fashion that the bent portion thereof faces the bent portion of the other of said bent layers on the side of said carcass layer, and both of said bent portions cover the right and left end portions of said belt layer consisting of said carbon fiber cords on the side of said tread portion.

6. A pneumatic radial tire for a passenger car according to claim 1, wherein one belt layer consisting of the aromatic polyamide fiber cords is disposed on the side of said carcass layer, two belt layers consisting of the carbon fiber cords are disposed on the side of said tread portion in the proximity of said belt layer on the side of said carcass layer, both right and left end portions of said belt layer on the side of said carcass layer are bent towards said tread portion so that the bent portions cover the right and left end portions of said belt layers on the side of said tread portion.

7. A pneumatic radial tire for a passenger car according to claim 1, wherein two belt layers consisting of the aromatic polyamide fiber cords are disposed on the side of said carcass layer, one belt layer consisting of the carbon fiber cords is disposed on the side of said tread portion in the proximity of said belt layers on the side of said carcass layer, both right and left end portions of the lower layer of said belt layers on the side of said carcass layer are bent towards said tread portions so that the bent portions cover the right and left end portions of said bent layer on the side of said tread portion.

* * * * *